(12) United States Patent
Gupta et al.

(10) Patent No.: US 10,563,990 B1
(45) Date of Patent: Feb. 18, 2020

(54) EVENT-BASED ROUTE PLANNING

(71) Applicant: Palantir Technologies Inc., Palo Alto, CA (US)

(72) Inventors: Sonny Gupta, San Francisco, CA (US); Aaron Sekhri, Palo Alto, CA (US); Andreja Kogovsek, London (GB); Benjamin Dawes, Claverley (GB); Brandon Burr, San Francisco, CA (US); Chang Li, Palo Alto, CA (US); Elizabeth Caudill, San Francisco, CA (US); Zachary Romanow, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 261 days.

(21) Appl. No.: 15/590,947

(22) Filed: May 9, 2017

(51) Int. Cl.
  *G01C 21/34* (2006.01)
  *G01C 21/36* (2006.01)
  *G06Q 10/08* (2012.01)

(52) U.S. Cl.
  CPC ....... *G01C 21/343* (2013.01); *G01C 21/3667* (2013.01); *G06Q 10/08355* (2013.01)

(58) Field of Classification Search
  CPC .............. G01C 21/343; G01C 21/3667; G01C 21/3453; G06Q 10/08355
  See application file for complete search history.

(56) References Cited

U.S. PATENT DOCUMENTS

| | | | |
|---|---|---|---|
| 5,515,488 A | 5/1996 | Hoppe et al. | |
| 5,878,368 A * | 3/1999 | DeGraaf | G01C 21/3461 340/988 |
| 6,175,803 B1 * | 1/2001 | Chowanic | G01C 21/34 340/988 |
| 6,430,305 B1 | 8/2002 | Decker | |
| 6,633,812 B1 * | 10/2003 | Martin | G01C 21/3453 701/25 |
| 6,820,135 B1 | 11/2004 | Dingman | |

(Continued)

FOREIGN PATENT DOCUMENTS

| | | |
|---|---|---|
| EP | 2487610 | 8/2012 |
| EP | 2869211 | 5/2015 |

(Continued)

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

(Continued)

*Primary Examiner* — Michael J Zanelli
(74) *Attorney, Agent, or Firm* — Sheppard Mullin Richter & Hampton LLP

(57) ABSTRACT

Systems and methods are provided for event-based route planning. Information of events taking place in a predetermined geographic area is received. An origin and at least one destination are determined. One or more first routes for traveling from the origin to the destination are determined from the predetermined geographic area. One or more segments in each of the first routes are determined based on the received information, each segment being associated with a corresponding recommendation for travelling via the segment.

16 Claims, 8 Drawing Sheets

(56) References Cited

U.S. PATENT DOCUMENTS

| | | | |
|---|---|---|---|
| 6,978,419 B1 | 12/2005 | Kantrowitz | |
| 6,980,984 B1 | 12/2005 | Huffman et al. | |
| 7,168,039 B2 | 1/2007 | Bertram | |
| 7,461,077 B1 | 12/2008 | Greenwood | |
| 7,526,377 B2* | 4/2009 | Wiener | G01C 21/32 701/117 |
| 7,617,232 B2 | 11/2009 | Gabbert et al. | |
| 7,756,843 B1 | 7/2010 | Palmer | |
| 7,899,796 B1 | 3/2011 | Borthwick et al. | |
| 7,917,376 B2 | 3/2011 | Bellin et al. | |
| 7,941,321 B2 | 5/2011 | Greenstein et al. | |
| 8,024,111 B1* | 9/2011 | Meadows | G01C 21/3492 340/905 |
| 8,036,971 B2 | 10/2011 | Aymeloglu et al. | |
| 8,037,046 B2 | 10/2011 | Udezue et al. | |
| 8,046,283 B2 | 10/2011 | Burns | |
| 8,054,756 B2 | 11/2011 | Chand et al. | |
| 8,214,490 B1 | 7/2012 | Vos et al. | |
| 8,229,902 B2 | 7/2012 | Vishniac et al. | |
| 8,290,838 B1 | 10/2012 | Thakur et al. | |
| 8,302,855 B2 | 11/2012 | Ma et al. | |
| 8,386,377 B1 | 2/2013 | Xiong et al. | |
| 8,473,454 B2 | 6/2013 | Evanitsky et al. | |
| 8,484,115 B2 | 7/2013 | Aymeloglu et al. | |
| 8,489,641 B1 | 7/2013 | Seefeld et al. | |
| 8,577,911 B1 | 11/2013 | Stepinski et al. | |
| 8,589,273 B2 | 11/2013 | Creeden et al. | |
| 8,688,573 B1 | 4/2014 | Ruknoic et al. | |
| 8,744,890 B1 | 6/2014 | Bernier | |
| 8,799,799 B1 | 8/2014 | Cervelli et al. | |
| 8,806,355 B2 | 8/2014 | Twiss et al. | |
| 8,812,960 B1 | 8/2014 | Sun et al. | |
| 8,924,388 B2 | 12/2014 | Elliot et al. | |
| 8,924,389 B2 | 12/2014 | Elliot et al. | |
| 8,938,686 B1 | 1/2015 | Erenrich et al. | |
| 8,949,164 B1 | 2/2015 | Mohler | |
| 9,069,842 B2 | 6/2015 | Melby | |
| 9,100,428 B1 | 8/2015 | Visbal | |
| 9,111,281 B2 | 8/2015 | Stibel et al. | |
| 9,129,219 B1 | 9/2015 | Robertson et al. | |
| 9,256,664 B2 | 2/2016 | Chakerian et al. | |
| 9,280,618 B1 | 3/2016 | Bruce et al. | |
| 9,286,373 B2 | 3/2016 | Elliot et al. | |
| 9,335,911 B1 | 5/2016 | Elliot et al. | |
| 2002/0065708 A1 | 5/2002 | Senay et al. | |
| 2002/0095360 A1 | 7/2002 | Joao | |
| 2002/0095658 A1 | 7/2002 | Shulman | |
| 2002/0103705 A1 | 8/2002 | Brady | |
| 2002/0147805 A1 | 10/2002 | Leshem et al. | |
| 2003/0126102 A1 | 7/2003 | Borthwick | |
| 2004/0034570 A1 | 2/2004 | Davis | |
| 2004/0111480 A1 | 6/2004 | Yue | |
| 2004/0153418 A1 | 8/2004 | Hanweck | |
| 2004/0236688 A1 | 11/2004 | Bozeman | |
| 2005/0010472 A1 | 1/2005 | Quatse et al. | |
| 2005/0086207 A1 | 4/2005 | Heuer et al. | |
| 2005/0154628 A1 | 7/2005 | Eckart et al. | |
| 2005/0154769 A1 | 7/2005 | Eckart et al. | |
| 2006/0026120 A1 | 2/2006 | Carolan et al. | |
| 2006/0026170 A1 | 2/2006 | Kreitler et al. | |
| 2006/0080283 A1 | 4/2006 | Shipman | |
| 2006/0143034 A1 | 6/2006 | Rothermel | |
| 2006/0143075 A1 | 6/2006 | Carr et al. | |
| 2006/0143079 A1 | 6/2006 | Basak et al. | |
| 2007/0000999 A1 | 1/2007 | Kubo et al. | |
| 2007/0011304 A1 | 1/2007 | Error | |
| 2007/0038646 A1 | 2/2007 | Thota | |
| 2007/0150801 A1 | 6/2007 | Chidlovskii et al. | |
| 2007/0156673 A1 | 7/2007 | Maga | |
| 2007/0162454 A1 | 7/2007 | D'Albora et al. | |
| 2007/0185867 A1 | 8/2007 | Maga | |
| 2007/0192122 A1 | 8/2007 | Routson et al. | |
| 2007/0284433 A1 | 12/2007 | Domenica et al. | |
| 2008/0065655 A1 | 3/2008 | Chakravarthy et al. | |
| 2008/0069081 A1 | 3/2008 | Chand et al. | |
| 2008/0077642 A1 | 3/2008 | Carbone et al. | |
| 2008/0103996 A1 | 5/2008 | Forman et al. | |
| 2008/0208735 A1 | 8/2008 | Balet et al. | |
| 2008/0222295 A1 | 9/2008 | Robinson et al. | |
| 2008/0243711 A1 | 10/2008 | Aymeloglu et al. | |
| 2008/0255973 A1 | 10/2008 | El Wade et al. | |
| 2008/0270328 A1 | 10/2008 | Lafferty et al. | |
| 2008/0275643 A1* | 11/2008 | Yaqub | G01C 21/343 701/412 |
| 2008/0294663 A1 | 11/2008 | Heinley et al. | |
| 2008/0313132 A1 | 12/2008 | Hao et al. | |
| 2009/0076845 A1 | 3/2009 | Bellin et al. | |
| 2009/0094166 A1 | 4/2009 | Aymeloglu et al. | |
| 2009/0094270 A1 | 4/2009 | Alirez et al. | |
| 2009/0106178 A1 | 4/2009 | Chu | |
| 2009/0112745 A1 | 4/2009 | Stefanescu | |
| 2009/0125359 A1 | 5/2009 | Knapic | |
| 2009/0125459 A1 | 5/2009 | Norton et al. | |
| 2009/0132953 A1 | 5/2009 | Reed et al. | |
| 2009/0157732 A1 | 6/2009 | Hao et al. | |
| 2009/0187546 A1 | 7/2009 | Whyte et al. | |
| 2009/0187548 A1 | 7/2009 | Ji et al. | |
| 2009/0249244 A1 | 10/2009 | Robinson et al. | |
| 2009/0254842 A1 | 10/2009 | Leacock et al. | |
| 2009/0259636 A1 | 10/2009 | Labrou et al. | |
| 2009/0271343 A1 | 10/2009 | Vaiciulis et al. | |
| 2009/0307049 A1 | 12/2009 | Elliott et al. | |
| 2009/0313463 A1 | 12/2009 | Pang et al. | |
| 2009/0313473 A1 | 12/2009 | Herz | |
| 2009/0319418 A1 | 12/2009 | Herz | |
| 2009/0319515 A1 | 12/2009 | Minton et al. | |
| 2009/0319891 A1 | 12/2009 | MacKinlay | |
| 2010/0030722 A1 | 2/2010 | Goodson et al. | |
| 2010/0031141 A1 | 2/2010 | Summers et al. | |
| 2010/0042922 A1 | 2/2010 | Bradateanu et al. | |
| 2010/0057622 A1 | 3/2010 | Faith et al. | |
| 2010/0070842 A1 | 3/2010 | Aymeloglu et al. | |
| 2010/0098318 A1 | 4/2010 | Anderson | |
| 2010/0106752 A1 | 4/2010 | Eckardt et al. | |
| 2010/0114887 A1 | 5/2010 | Conway et al. | |
| 2010/0131502 A1 | 5/2010 | Fordham | |
| 2010/0161735 A1 | 6/2010 | Sharma | |
| 2010/0185382 A1* | 7/2010 | Barker | G08G 1/0104 701/119 |
| 2010/0191563 A1 | 7/2010 | Schlaifer et al. | |
| 2010/0211535 A1 | 8/2010 | Rosenberger | |
| 2010/0235915 A1 | 9/2010 | Memon et al. | |
| 2010/0262688 A1 | 10/2010 | Hussain et al. | |
| 2010/0293174 A1 | 11/2010 | Bennett et al. | |
| 2010/0312837 A1 | 12/2010 | Bodapati et al. | |
| 2011/0040776 A1 | 2/2011 | Najm et al. | |
| 2011/0061013 A1 | 3/2011 | Bilicki et al. | |
| 2011/0078173 A1 | 3/2011 | Seligmann et al. | |
| 2011/0093327 A1 | 4/2011 | Fordyce, III et al. | |
| 2011/0099133 A1 | 4/2011 | Chang et al. | |
| 2011/0118972 A1* | 5/2011 | Boschker | G01C 21/3476 701/532 |
| 2011/0153384 A1 | 6/2011 | Horne et al. | |
| 2011/0173093 A1 | 7/2011 | Psota et al. | |
| 2011/0208565 A1 | 8/2011 | Ross et al. | |
| 2011/0208724 A1 | 8/2011 | Jones et al. | |
| 2011/0213655 A1 | 9/2011 | Henkin | |
| 2011/0218955 A1 | 9/2011 | Tang | |
| 2011/0270604 A1 | 11/2011 | Qi et al. | |
| 2011/0270834 A1 | 11/2011 | Sokolan et al. | |
| 2011/0289397 A1 | 11/2011 | Eastmond et al. | |
| 2011/0295649 A1 | 12/2011 | Fine | |
| 2011/0314007 A1 | 12/2011 | Dassa et al. | |
| 2011/0314024 A1 | 12/2011 | Chang et al. | |
| 2012/0004904 A1 | 1/2012 | Shin et al. | |
| 2012/0011238 A1 | 1/2012 | Rathod | |
| 2012/0011245 A1 | 1/2012 | Gillette et al. | |
| 2012/0022945 A1 | 1/2012 | Falkenborg et al. | |
| 2012/0054284 A1 | 3/2012 | Rakshit | |
| 2012/0059853 A1 | 3/2012 | Jagota | |
| 2012/0066166 A1 | 3/2012 | Curbera et al. | |
| 2012/0079363 A1 | 3/2012 | Folting et al. | |
| 2012/0084117 A1 | 4/2012 | Tavares et al. | |
| 2012/0084287 A1 | 4/2012 | Lakshminarayan et al. | |
| 2012/0089606 A1 | 4/2012 | Eshwar et al. | |

(56) References Cited

U.S. PATENT DOCUMENTS

| | | |
|---|---|---|
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0170512 A1* | 6/2015 | Scofield ............. G01C 21/3492 701/118 |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0054136 A1* | 2/2016 | Raab .................. G01C 21/26 701/423 |
| 2016/0086285 A1* | 3/2016 | Jordan Peters ........ G06Q 40/08 705/4 |
| 2016/0180557 A1 | 6/2016 | Yousaf et al. |
| 2017/0262790 A1* | 9/2017 | Khasis ................ G05D 1/0287 |

FOREIGN PATENT DOCUMENTS

| | | |
|---|---|---|
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| JP | 2009-058457 | * 3/2009 |
| WO | WO 2005/116851 | 12/2005 |
| WO | WO 2012/061162 | 5/2012 |

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP BusinessObjects Explorer Online Help," Mar. 19, 2012, retrieved on Apr. 21, 2016 http://help.sap.com/businessobject/product_guides/boexir4/en/xi4_exp_user_en.pdf.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services", HiPC 2006, LNCS 4297, pp. 277-288, 2006.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

(56) References Cited

OTHER PUBLICATIONS

Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno. et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/483,527 dated Apr. 29, 2016.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/858,647 dated Mar. 4, 2016.
Official Communication for European Patent Application No. 14187996.5 dated Feb. 12, 2015.
Official Communication for European Patent Application No. 14187996.5 dated Feb. 19, 2016.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 15200073.3 dated Mar. 30, 2016.
Official Communication for European Patent Application No. 15201924.6 dated Apr. 25, 2016.
Official Communication for European Patent Application No. 16152984.7 dated Mar. 24, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404489.5 dated Oct. 6, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404499.4 dated Sep. 29, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/141,252 dated Apr. 14, 2016.
Official Communication for U.S. Appl. No. 14/141,252 dated Oct. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated Jun. 16, 2016.
Official Communication for U.S. Appl. No. 14/225,160 dated May 20, 2015.
Official Communication for U.S. Appl. No. 14/225,160 dated Apr. 22, 2016.
Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.

(56) References Cited

OTHER PUBLICATIONS

Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/571,098 dated Feb. 23, 2016.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated May 25, 2016.
Official Communication for U.S. Appl. No. 14/929,584 dated Feb. 4, 2016.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): Wirn Vietri 2002, LNCS 2486, pp. 3-20.
Vose et al., "Help File for ModelRisk Version 5," 2007, Vose Software, pp. 349-353. [Uploaded in 4 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

\* cited by examiner

EVENT-BASED ROUTE PLANNING

FIELD OF THE INVENTION

This disclosure generally relates to approaches and techniques for route planning.

BACKGROUND

Under conventional approaches, route planning across regions with evolving conditions poses great challenges. Many factors in addition to road traffic may affect the planning.

SUMMARY

Various embodiments of the present disclosure can include systems, methods, and non-transitory computer readable media configured to perform event-based route planning. Information of events taking place in a predetermined geographic area is received. An origin and at least one destination are determined. One or more first routes for traveling from the origin to the destination are determined from the predetermined geographic area. One or more segments in each of the first routes are determined based on the received information, each segment being associated with a corresponding recommendation for travelling via the segment.

In some embodiments, the information of the events comprises respective times at which the events occurred within a predetermined date range.

In some embodiments, determining the one or more segments based on the received information comprises determining the corresponding one or more recommendations for travelling via the segment based on a frequency of the events within the predetermined date range.

In some embodiments, determining the one or more segments based on the received information comprises determining the corresponding one or more recommendations based on time of the travel from the origin to the destination and times of the events in a given day.

In some embodiments, the information of the events taking place in the geographic area comprises respective geographic locations of the events.

In some embodiments, determining the one or more segments based on the received information comprises determining the one or more segments based on one or more of the events taking place within a predetermined distance from the segments.

In some embodiments, the systems, methods, and non-transitory computer readable media are further configured to categorize the one or more segments based on the corresponding one or more recommendations, and display the one or more categorized segments on a map.

In some embodiments, the systems, methods, and non-transitory computer readable media are further configured to determine one or more second routes alternative to at least a portion of the first route, the portion of the first route comprising one or more segments associated with one or more corresponding recommendations below a predetermined threshold for travel.

In some embodiments, determining from the predetermined geographic area the one or more first routes for travelling from the origin to the destination comprises: based on the received information, determining one or more stops in the predetermined geographic area, each stop being associated with a corresponding recommendation for travelling via the stop; and based on the recommendation for travelling via the each stop, determining the first routes each comprising the one or more stops.

In some embodiments, the travel is implemented by a delivery carrier.

In some embodiments, based on the received information, determining the one or more stops in the predetermined geographic area comprises determining the one or more stops based on delivery requirement to one or more locations in the predetermined geographic area.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Route planning typically involves determining one or more routes that begin at some origin and end at one or more destinations. In general, planning a route can involve analyzing geographic map data to identify potential routes and evaluating those potential routes based on various criteria such as traffic conditions. While such conventional approaches to route planning may be effective in some circumstances, these approaches are often inadequate in other situations. For example, existing approaches to route planning can be ineffective in situations involving humanitarian disaster relief.

A claimed solution rooted in computer technology overcomes problems specifically arising in the realm of route planning. In various implementations, a computing system may be configured to plan one or more routes based on one or more conditions and/or constraints, such as past events that took place within a certain time period, events that took place within some geographic distance from the routes, times at which the routes will be used, required stops along the route, among other factors. Such conditions and/or constraints can provide useful insights when providing route guidance in geographic regions that lack modern infrastructure (e.g., disaster zones). In one example, a computer system may be configured to receive information of events taking place in a given geographic area. In this example, the computer system can determine an origin and at least one destination. The computer system can then determine one or more first routes to travel between the origin and the destination within the geographic area. Further, based on the received information, the computer system can determine one or more segments in each of the one or more first routes. In some implementations, each segment may be associated with a recommendation for traveling along the segment. In some implementations, this recommendation may be provided in degrees (or some measure of difficulty for traveling along the segment). For any portion of the route comprising one or more segments with recommendations below a threshold travel recommendation, the computing system can be configured to determine one or more alternative routes that do not include those segments. As such, comprehensive route planning can be determined for any travel in the geographic area. Further, multiple travels across the geographic area can be clearly determined and synthesized on a map.

Figure 1:
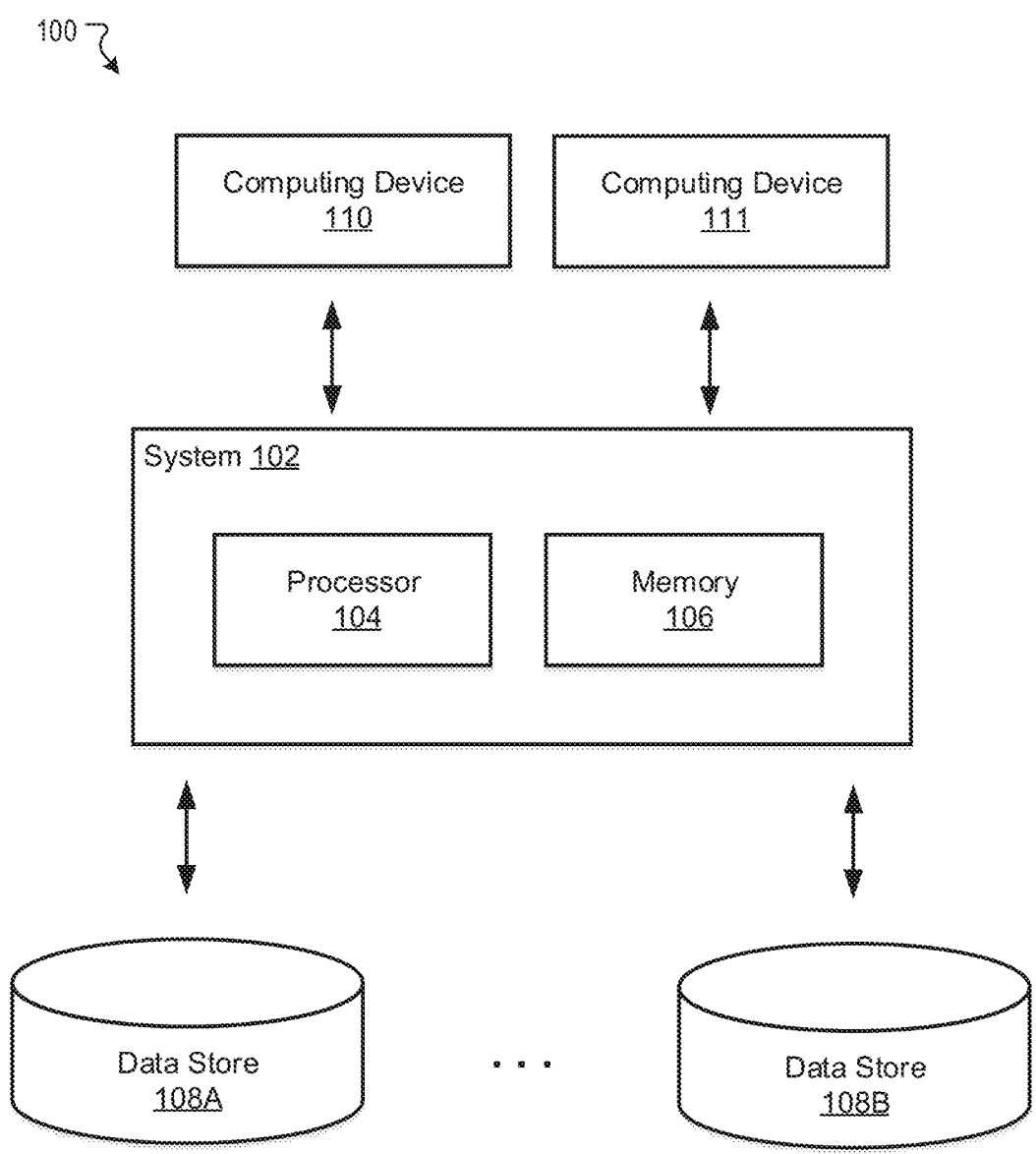
FIG. 1 illustrates an example environment for event-based route planning, in accordance with various embodiments.

FIG. 1 illustrates an example environment 100 for event-based route planning, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The environment 100 may also include one or more computing devices (e.g., computing devices 110 and 111) and one or more data stores (e.g., data stores 108A and 108B) that are accessible to the system 102. For example, the data stores 108A and 108B may each include one or more databases to store various data needed for event-based route planning (e.g., geographic map data, route data, etc.). In some implementations, the data stores 180A and/or 180B (e.g., databases stored in the data stores 180A and/or 180B) may store information describing events that have occurred in various geographic areas (e.g., date of the event, time of the event, nature of the event, location of the event, stopping points (e.g., waypoints) in the various geographic areas, etc.), tasks for the trip (e.g., origins, destinations, delivery tasks to various locations in the geographic areas, etc.), and so on. In some implementations, different databases and/or information may be stored in data stores that are accessible to the system 102. In some implementations, the data store 180A and/or 180B may be managed and/or operated by different entities. For example, the data store 108A may be managed by a first entity, enterprise, or group of people tasked with obtaining and/or managing information of events in various geographic regions. In this example, the data store 108B may be managed by a second entity, enterprise, or group of people tasked with obtaining and/or managing information of trip tasks. Depending on the implementation, information stored in the data store 108A and/or the data store 108B may or may not be shared among entities managing the data stores 108A and 108B. In some implementations, data stores accessible to the system 102 (e.g., the data stores 108A and 108B) are shared among multiple entities (e.g., enterprise, organization, individual, group of individuals, etc.). This shared data may be used by the entities, for example, to derive constructive information.

In some embodiments, the system 102 and the computing device 110 may be integrated in a single device or system. Alternatively, the system 102 and the computing device 110 may operate as separate devices. For example, the computing device 110 may be a mobile device and the system 102 may be a server. The data store(s) may be stored anywhere accessible to the system 102, for example, in the memory 106, in the computing device 110, in another device coupled to the system 102, storage location (e.g., cloud-based storage system, network file system, etc.), storage device (e.g., network storage device), etc. In general, the system 102, the computing device 110, and the data stores 108A and/or 108B may be able to communicate with one another through one or more wired or wireless networks (e.g., the Internet) through which data can be communicated. In some embodiments, computing devices (e.g., the computing device 111) may be configured to track locations of entities (e.g., vehicles, vehicle drivers, etc.) and report their respective locations to the system 102. Such locations may be reported through various interfaces including, for example, the interfaces described in reference to FIGS. 3A-3D. For example, Global Positioning System (GPS) data may be obtained from computing devices (e.g., mobile phones, GPS tracking devices, etc.) associated with the entities. This GPS data can be plotted in one or more interfaces to identify respective entity locations. Various aspects of the system 102 are described below in reference to FIG. 2 to FIG. 4.

Figure 2:
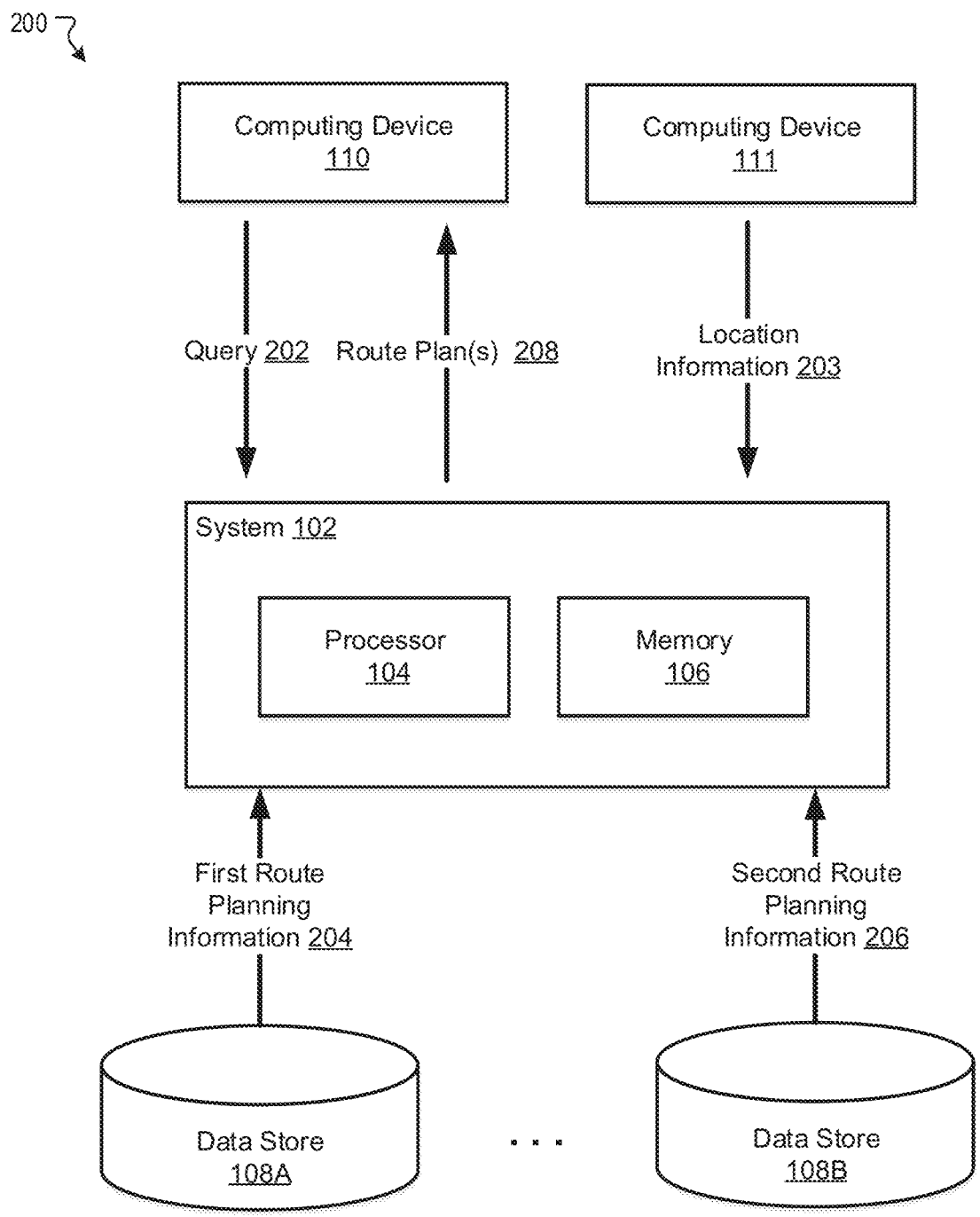
FIG. 2 illustrates an example system for event-based route planning, in accordance with various embodiments.

FIG. 2 illustrates an example system 200 for event-based route planning, in accordance with various embodiments. The operations shown in FIG. 2 and presented below are intended to be illustrative.

In various embodiments, a user may operate a computing device 110 to submit one or more queries (e.g., a query 202) to the system 102. In various embodiments, information sent and received between devices (e.g., the computing device 110, the system 102, etc.) can be transmitted over one or more computer networks (e.g., local area network, the Internet, etc.). The query 202 may be a request (or operation) to generate one or more route plans. The planned travel may be conducted by one or more individuals with or without vehicles (e.g., in a delivery carrier, in a convoy, on foot, etc.). The query 202 may specify one or more conditions for the route plans. In some implementations, the conditions specified in the query 202 may include one or more origins (e.g., geographic location from which the journey begins), one or more waypoints (e.g., stopping point), one or more destinations (e.g., geographic location at which the journey ends), the date and time of the travel, to name some examples.

The query 202 may be run (or executed) using one or more data stores, such as the data stores 108A and 108B. For example, in response to the query 202, the system 102 may obtain first route planning information 204 from the data store 108A and second route planning information 206 from the data store 108B. In general, the first route planning information 204 and the second route planning information 206 can be associated with various geographic areas (or regions). In some implementations, information corresponding to such geographic areas may be stored in the data store 108A and the data store 108B because these geographic regions may include routes that have been used in the past or are expected to be used in the future.

In some implementations, the data store 108A may store various event-based information for the various geographic regions. This event-based information can include, for example, respective dates and/or times of various events, information describing the nature of those events, information describing how often (or frequently) the events occurred, the number of events within a given time period (or date range), and/or information describing respective geographic locations of the events, to name some examples. In some implementations, an event may be detrimental to, may hamper, or may otherwise impact travel in a geographic region that corresponds to the event location. For example, an event may correspond to a natural disaster (e.g., wild fire, flood, earthquake, landslide, soil erosion, tornedo, etc.), a weather condition (e.g., storm, fog, hail, etc.), an activity (e.g., conflict, police activity, road maintenance activity, etc.), a road or areal condition (e.g., icy road, unshoveled snow, fallen trees, road blockage, road accident, road debris, etc.), and/or road traffic, to name some examples.

In some implementations, the data store 108B may store various route planning information. In some implementations, route planning information includes information describing points of interest (e.g., stopping points, waypoints, etc.) in the various geographic areas, tasks (e.g., deliveries) to be performed at various locations in the geographic areas, resources available to perform the tasks (e.g., drivers available, vehicles available, etc.), among other information. In some embodiments, the data store 108A and the data store 108B may be integrated into one data store, or may be separately stored in different data stores.

The system 102 may analyze the received first route planning information 204 and the second route planning information 206 to obtain and/or determine constructive information, such as areal travel recommendations, route plans and recommendations, travel stop recommendations, etc. In various embodiments, the system 102 may determine one or more route plans 208 (e.g., one or more routes in one or more geographic areas) based at least in part on the information provided with the query 202 (e.g., one or more origins and destinations), the obtained first route planning information 204, and the second route planning information 206. Each of the planned routes may comprise one or more segments. In some implementations, each segment may be associated with a corresponding recommendation for travelling via (or through) the segment determined by various methods. In some embodiments, a recommendation for travelling via the segment may be determined based on a frequency of events took place along the segment within a predetermined date range. For example, if a certain event occurs along the segment every Monday, then that segment can be associated with a negative or lower recommendation for travelling via the segment on Mondays. However, in this example, the segment can be associated with a positive recommendation for traveling via the segment on other non-event days, e.g., Wednesdays. In some embodiments, a recommendation for traveling via a segment may be determined based on the time of the planned travel and the times of the events that took place on the day of travel and/or a specified number of days before the planned travel. For example, a recommendation for travelling via the segment in the morning is positive or higher if events occurred along, or within some threshold distance from, the segment every other night. In some embodiments, a recommendation for traveling via a segment may be determined based on one or more events that occurred within a predetermined distance from the segment. For example, the degree of influence of an event to the route travel may decrease as the distance of the event location from the route increases. In some embodiments, the segments may be categorized based on the corresponding recommendations (e.g., highly recommended, neutral, not recommended, etc.). In some embodiments, the one or more route planes may comprise a first route and one or more second routes. The one or more second routes may comprise alternative(s) to at least a portion of the first route. The portion of the first route may comprise one or more segments associated with one or more corresponding recommendations below a predetermined threshold for travel (e.g., not recommended for travel). With that, decision makers can compare various route travel options derived based on event data in the region, and accordingly pick an appropriate route. As such, the risk of travel delay and interruption can be minimized before the departure, and the security and efficiency for the travel can be enhanced.

The route planning may also be subject to many other conditions. For example, there may be one or more stopping points during the travel, where cargo needs to be delivered. Based on the delivery requirement to such stopping points and locations of the stopping points in the predetermined geographic area, cargo load the travel can be determined in advance. Like the route segments, each stop may be determined as associated with a recommendation for travel, based on the events took place in the vicinity. According to the recommendation for travelling via the each stop and the delivery tasks, route plans each comprising one or more stops may be determined. For example, a stop that is not recommended may be avoided. As such, an accurate plan for cargo load and delivery stops can be determined for improved security and efficiency.

Accordingly, the system 102 may transmit the determined one or more route plans 208 to the computing device 110 for presentation and selection. For example, the one or more categorized segments of each planned route may be displayed on a map. More details describing the route planning and planned routes are provided below in reference to FIGS. 3A-D.

Further, in some embodiments, the computing device 111 may be configured to track locations of one or more entities (e.g., vehicles, people, etc.) and report the location information 203 to the system 102. For example, the computing device 111 may be a device that supports GPS tracking capability. This device can be installed in a vehicle travelling on the planned route. The system 102 may render the location information in various ways, such as displaying the locations in real-time on route maps in one or more of FIGS. 3A-D.

FIGS. 3A-D respectively illustrate example interfaces 300, 310, 320, and 330 for collaborating using different object models, in accordance with various embodiments. The description of FIGS. 3A-D are intended to be illustrative and may be modified in various ways according to the implementation. The interfaces 300, 310, 320, and 330 may be provided by a computing system (e.g., the system 102) and accessed by a computing device (e.g., the computing device 110). In some embodiments, the interfaces may be presented through a respective display screen of the computing device 110 and/or the system 102. In some embodiments, the interfaces may be provided by a software application running on the computing device 110 and/or the system 102.

Figure 3A:
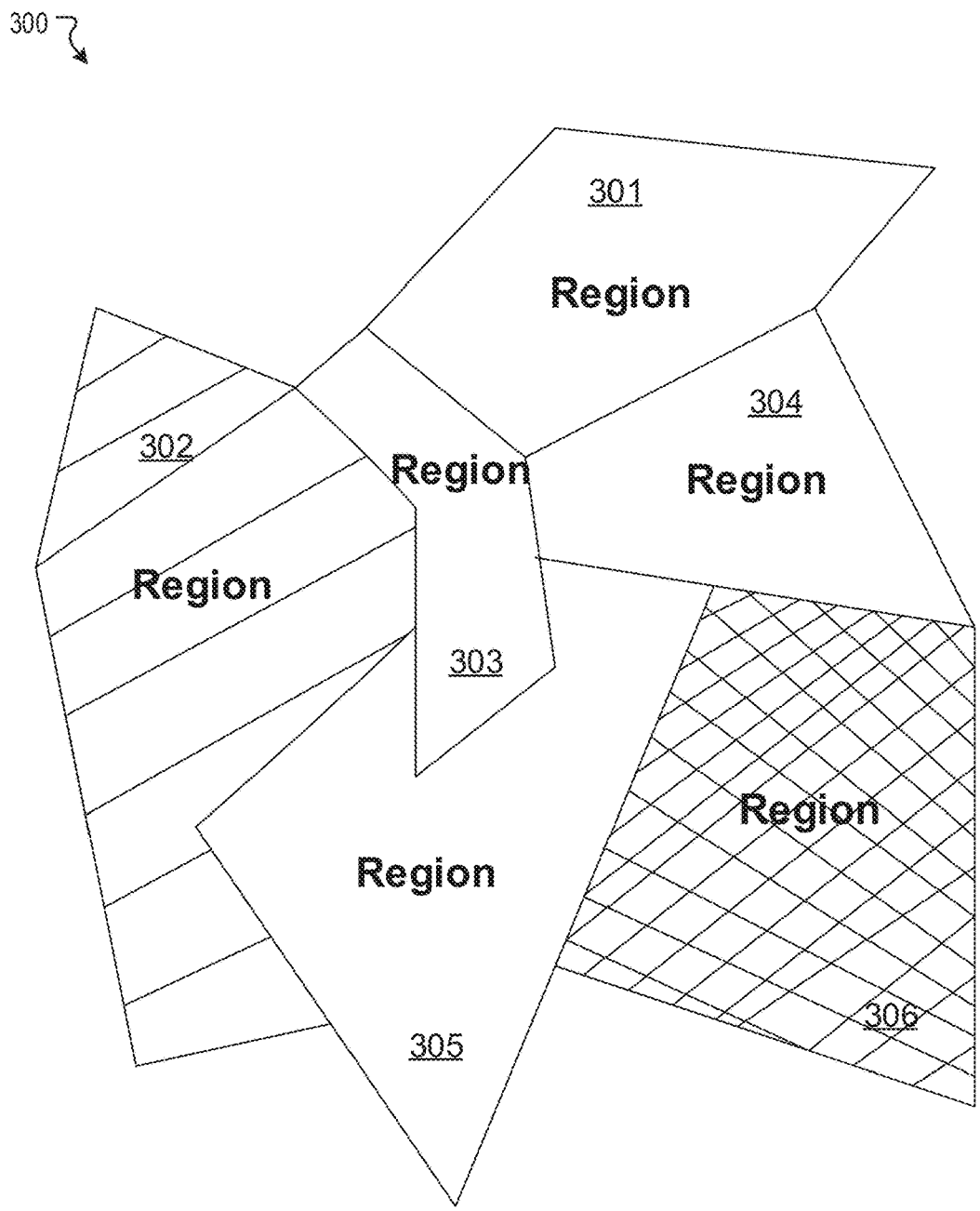
FIGS. 3A-D illustrate example interfaces for event-based route planning, in accordance with various embodiments.

As shown in FIG. 3A, system 102 may be configured to determine areal travel recommendations based on the received route planning information. Here, events took place in areas 301-306 are respectively summarized and categorized. Each area can be labeled (e.g., by pattern fill, by color, etc.) according to the events took place within. For example, compared to the unfilled areas 301 and 303-305, area 302 is filled with a light pattern and 306 is filled with a dense pattern, indicating that some events took place in area 302 and most (or more serious) events took place in area 306. When area 306 is selected, a summary of the corresponding events can be displayed. For example, if a date range of past two weeks is chosen, the events can be displayed as columns corresponding to the timeline, while a number of the events on each date can be represented by a relative column height. The events may be categorized (e.g., based on event type, impact, etc.). An analysis can also be determined and provided, such as a trend of the event(s) development, a flow of local resources or population in response to the event(s), etc.

Figure 3B:
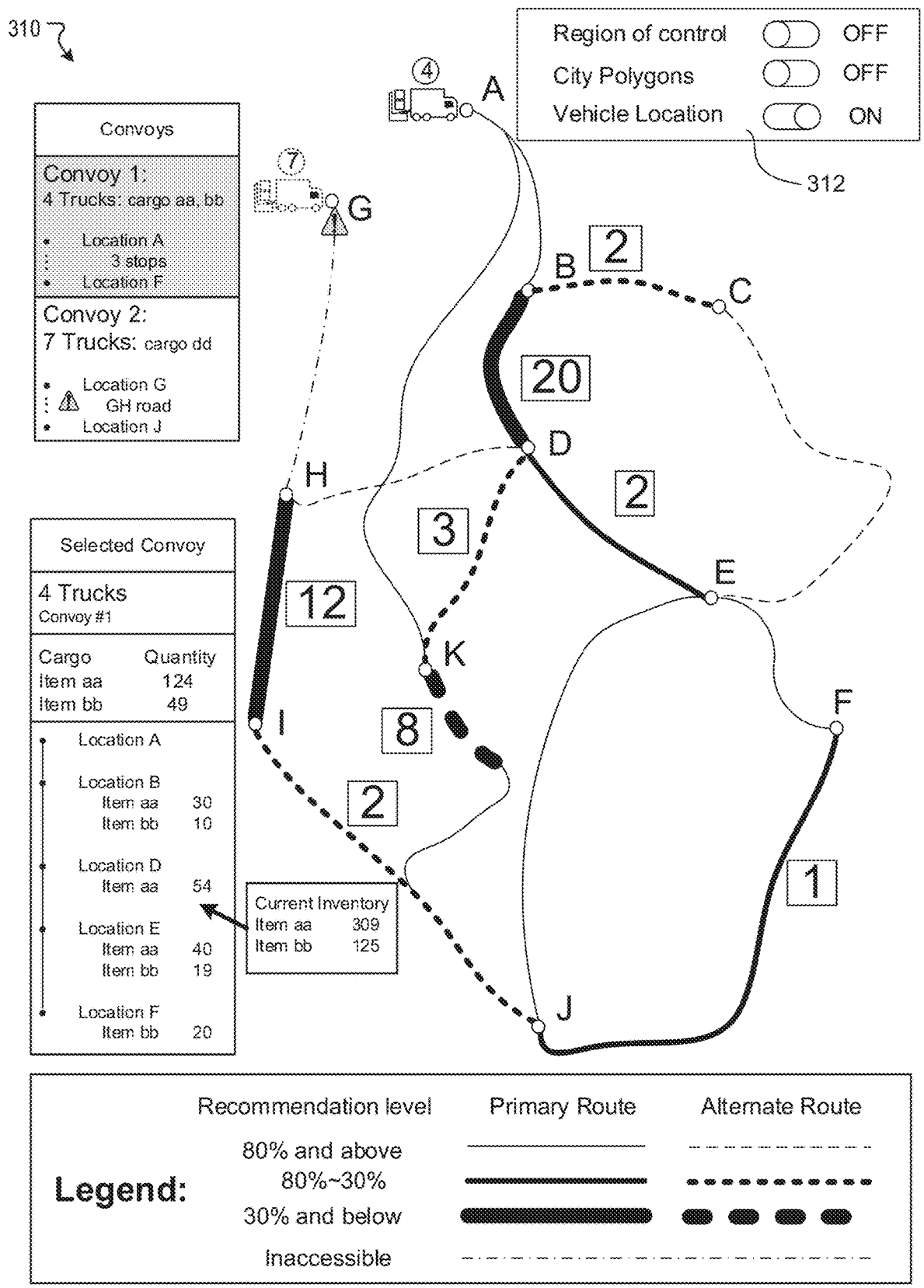

For the areas shown in FIG. 3A, one or more travel routes can be determined. As shown in FIG. 3B, system 102 may determine route plans and recommendations based on the received route planning information. Here, multiple locations A-J are connected by various route segments. These locations may be cities, towns, stops, border entry points, warehouses, etc. Every two locations may be connected by one or more route segments. The route segments may be represented by various methods (e.g., color coding), and line representations are used here. As shown at the bottom legend, primary routes or route segments (e.g., segments AK, AB, BD, DE, EF, EJ, FJ, HI, etc.) are in solid lines, while alternate routes or route segments are in dash lines (e.g., segments BC, CE, HD, DK, IJ, etc.), and inaccessible routes or route segments are in dash dot lines (e.g., segment GH). As shown, the system 102 can provide a set of filters 312 (e.g., "region on control" filter, "city polygons" filter, "vehicle location" filter, etc.) to the users. Such filters can be used to filter segments, alerts, vehicle location display, map layers, including zones of control and city polygons, etc. As such, users can select information that is of interest to be displayed. The filters can be similarly applied to FIGS. 3A, 3C, and 3D.

Each route or route segment, whether primary or secondary, may correspond to a level of recommendation for travelling via the route or route segment. For example, since the recommendation level decreases as the line weight increases, the level of recommendation for travelling via segment AB is higher than that via DE, which is higher than that via BD. The system 102 may generate the recommendation according to one or more configurable thresholds and/or rules. In some embodiments, such thresholds and/or rules can be used to determine when to provide recommendations. For example, a given rule may require that one or more thresholds relating to one or more events be satisfied (e.g., a threshold number of events of a given type, a threshold number of events within a certain distance of a geographic location, etc.) before any recommendations are provided. In general, thresholds and/or rules may be defined for any event data from which recommendations may be generated as described herein. For example, in some embodiments the level of recommendation may correlate to the events (the number of which is labelled in a square) that took place in areas associated with the route. By threshold comparison, as the events occurring within a certain distance from the route escalate in quantity or graveness, the level of recommendation may drop. As another example, the level of recommendation may correlate to the type of the events took place in areas associated with the route. More serious events (e.g., events that prevent travel along a given route) may trigger a drop in recommendation level more likely than less serious events. As such, planners can visualize patterns of events in various regions and the evolvement over time, based on which salient decisions can be made as to travels across such areas.

In some embodiments, one or more travels and travel routes may be determined and synthesized on the map. In FIG. 3B, two convoys are shown as truck icons geared up at locations A and F and are also listed in an information column. The first convoy involves four trucks from origin A to destination F via three stops, carrying cargo "aa" and "bb". The second convoy involved seven trucks from origin G to destination J, carrying cargo "dd". The number of trucks is also shown at the corresponding truck icon on the map. Since route segment G-H is inaccessible (or alternatively, entry point G is closed), a warning sign is shown on the map and in the information column to give notice that the second convoy should consider not departing. Accordingly, the truck icon of the second convoy is shown using a dashed line on the map.

On selecting the first convoy, related details including, for example, cargo to be carried by the convoy, stopping locations, and cargo delivery plan to each stopping location, can be shown. Here, the four trucks of the first convoy are to carry 124 units of item aa and 49 units of item bb. On the route from location A to location F, the first convoy is to deliver 30 units of item aa and 10 units of item bb to location B, 54 units of item aa to location D, 40 units of item aa and 19 units of item bb to location E, and 20 units of item bb to location F. By hovering a cursor on any of the location, a current inventory can be shown. For example, location E currently stores 309 units of item aa and 125 units of item bb. As such, multiple (convoy) travels can be synthesized in one place, associated with route choices and delivery tasks that are easily retrievable.

Figure 3C:
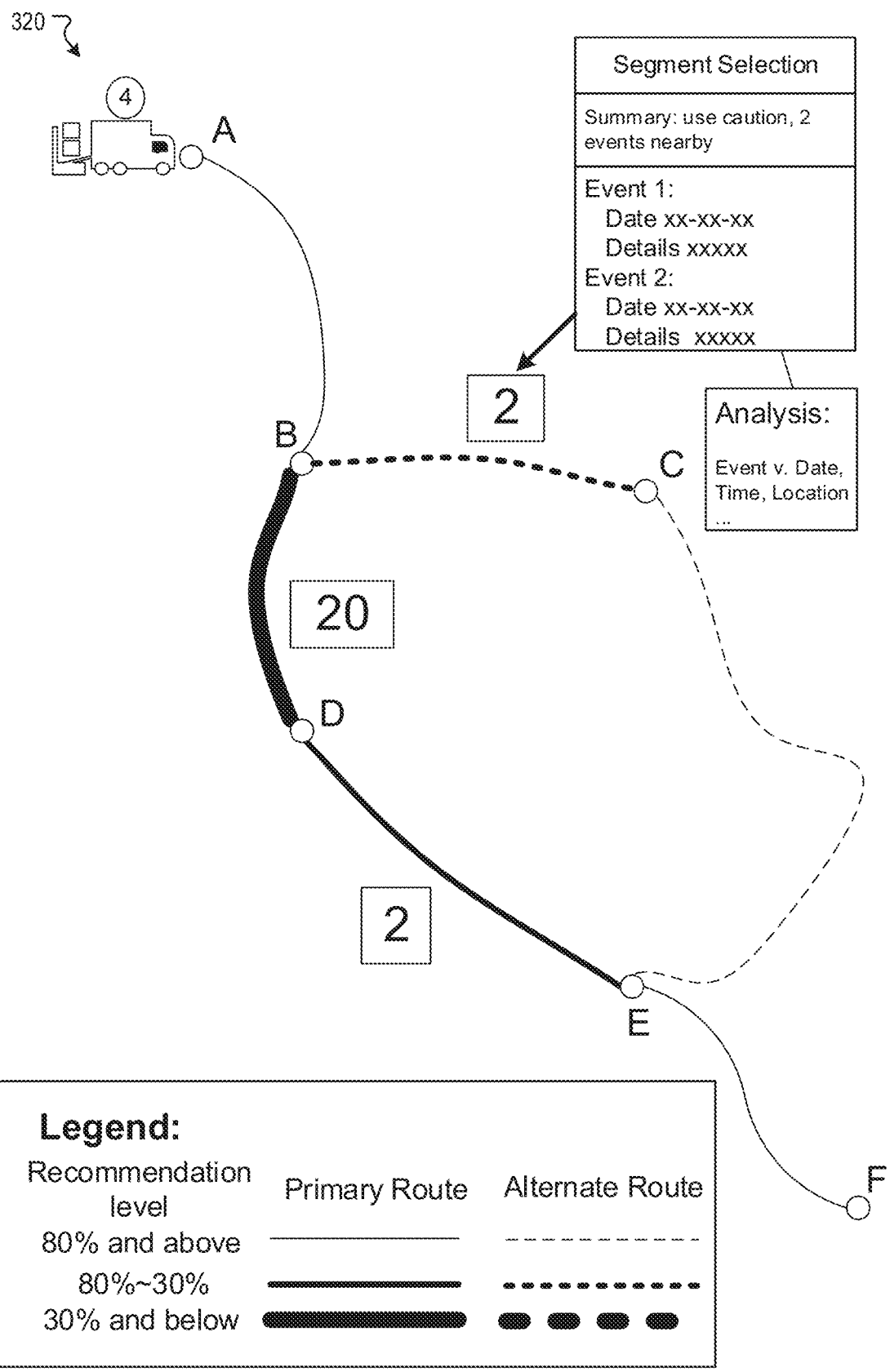

A particular route of the routes shown in FIG. 3B can be selected for further analysis as illustrated in FIG. 3C. In FIG. 3C, only routes relevant to the first convoy's trip are shown. The route representation and legend are similar to those in FIG. 3B. Here, the determined primary route is A-B-D-E-F for the shortest travel distance. However, route segment B-D is below 30% of recommendation level, as plagued by twenty events that can negatively impact travels on this route segment. An alternative route A-B-C-E-F is also determined, presenting a less risky choice. The alternative route appears to be clear, except for two events concerning the route segment B-C. On hovering over the segment B-C, details of the two events can be shown. For example, a summary may be provided to suggest travelling with caution, along with the events' dates and details of the events. Further, analysis of the events, such as histograms of the events with respect to date, time, and location, can be determined and shown. With this information, a planner of the trip can make a salient route choice for travelling from location A to location F. If the alternative route is chosen, the convoy cargo load can be updated by removing the delivery task to location D and add a delivery task to location C. As such, travel risks can be clearly presented and corresponding alternative routes can be determined. With that, the travel can be planned with minimized risk exposure.

Figure 3D:
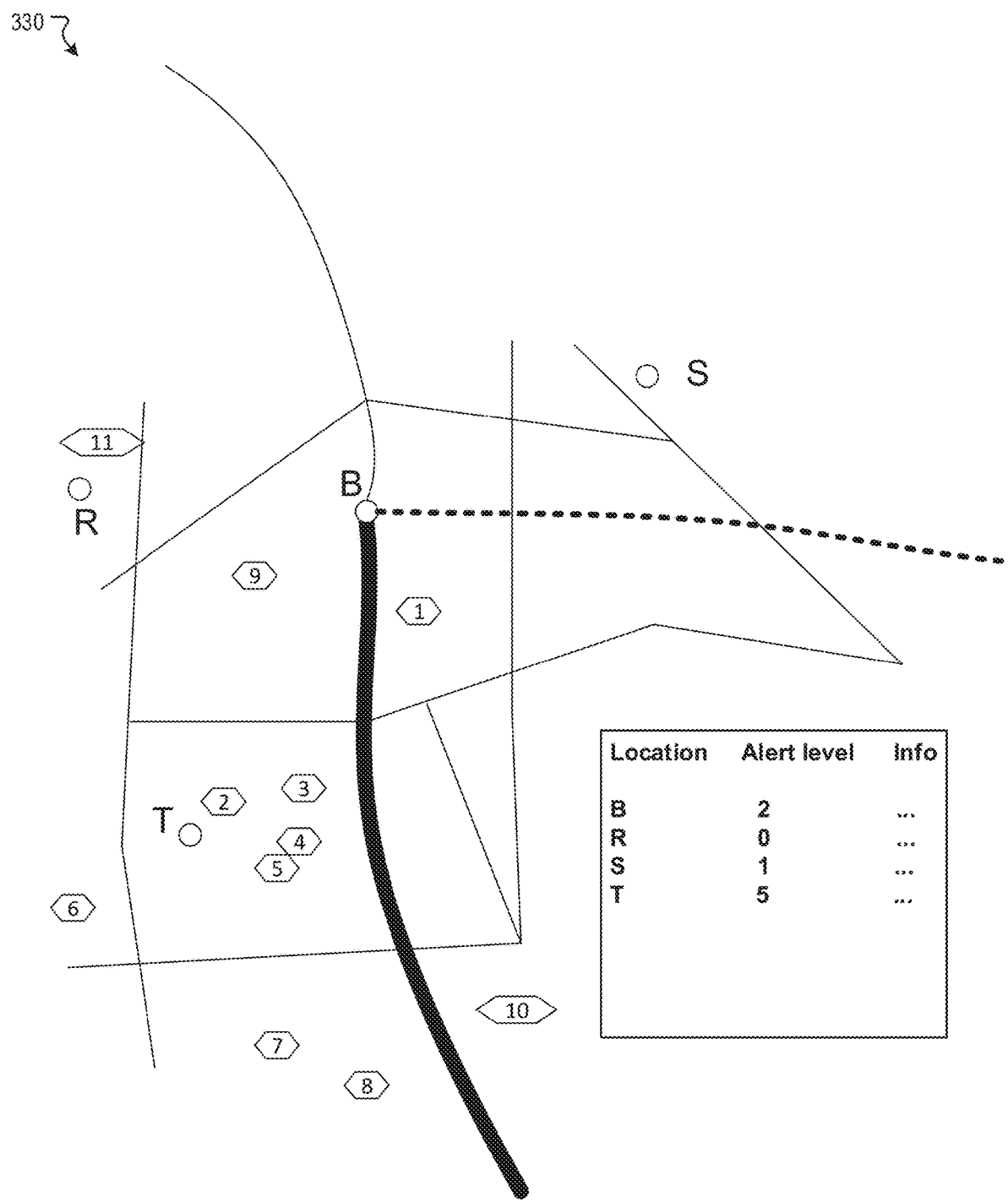

On selection of any of the locations, a more detailed map can be shown. FIG. 3D illustrates details of the surrounding area of location B. In addition to location B, locations R, S, and T are also indicated on the map. Each of the location may be a stop point choice for the convey (e.g., a warehouse, a meeting point, etc.). Events in this area are represented by polygons. For example, events 1 and 9 took place near location B, event 11 took place near location R, and events 2-6 took place near location T. Accordingly, a summary table with the alert levels of each location may be provided. Each alert level may scale with the number of events and/or the graveness of the events. Each alert level may also be referred to as a level of recommendation for the stop. Moreover, the event timeline, the current inventory, the event details and analysis described above with reference to FIGS. 3A-C can also be triggered in this example with reference to each stop location. As such, one or more stops within a region can be closely analyzed according to the recommendations and chosen for the trip to further lower the risk exposure.

Figure 4:
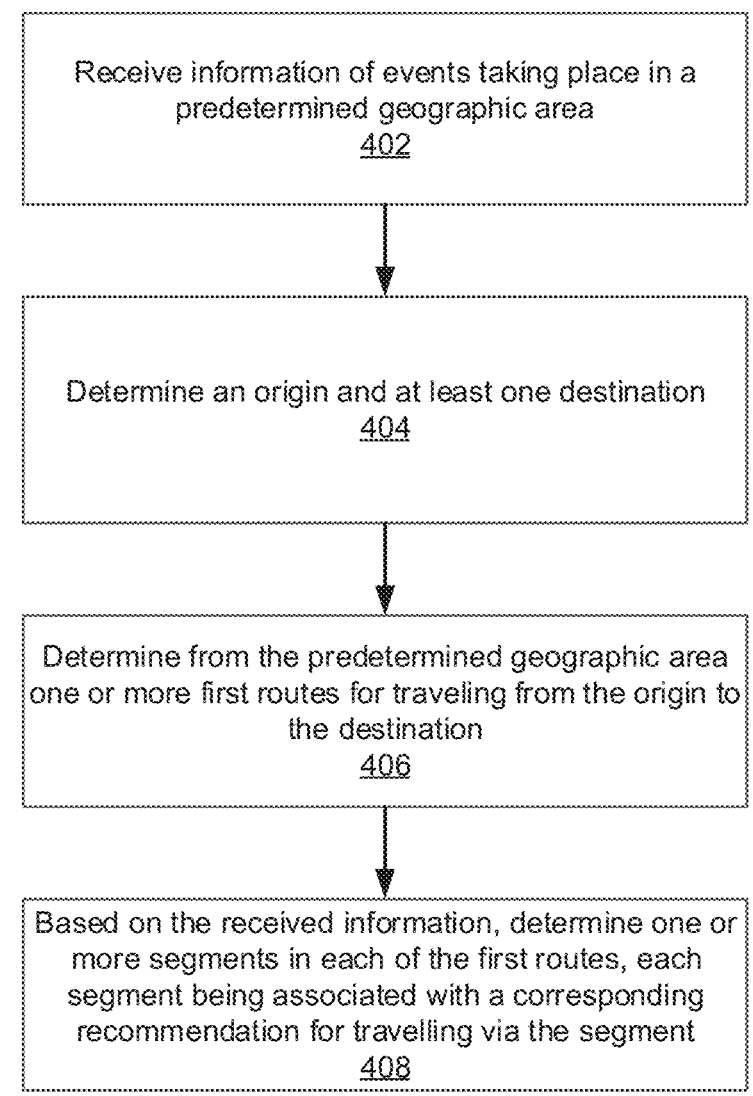
FIG. 4 illustrates a flowchart of an example method for event-based route planning, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, information of events taking place in a predetermined geographic area is received. At block 404, an origin and at least one destination are determined. At block 406, one or more first routes for traveling from the origin to the destination are determined from the predetermined geographic area. At block 408, one or more segments in each of the first routes are determined based on the received information, each segment being associated with a corresponding recommendation for travelling via the segment.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
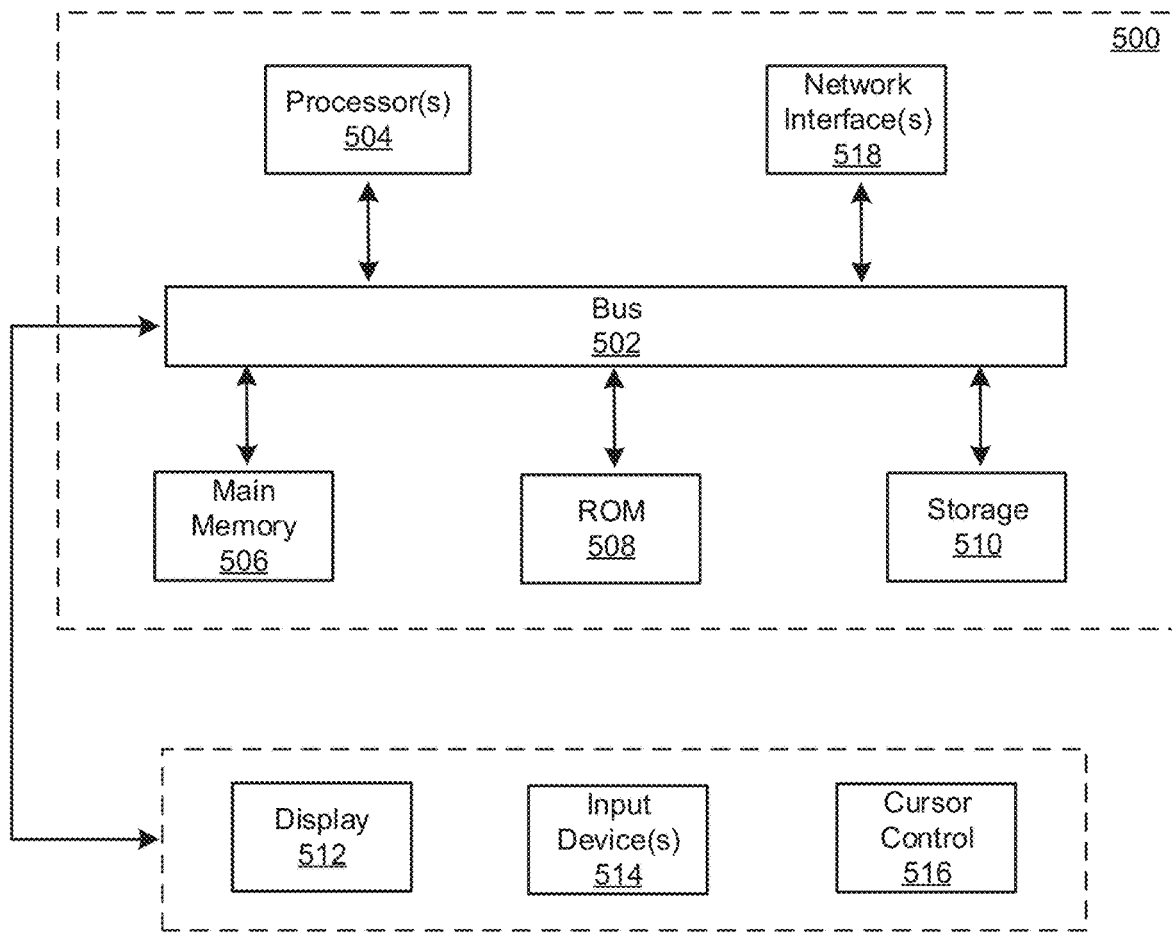
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computing system, comprising:
one or more processors; and
memory storing instructions that, when executed by the one or more processors, cause the system to perform:
receiving information of events in a predetermined geographic area, the information of the events comprising respective times at which the events occurred within a predetermined date range, and the information comprising a respective event type for each of the events, each of the respective event types being selected from a plurality of different event types;
determining an origin and at least one destination;
determining from the predetermined geographic area one or more first routes for traveling from the origin to the destination;
determining, based on the respective event types and the respective times at which the events occurred within the predetermined date range of the received information, one or more segments in each of the first routes, each segment being associated with a corresponding recommendation for travelling via the segment, the corresponding recommendation indicating a measure of difficulty for travelling via the segment;

categorizing the one or more segments based on the corresponding one or more recommendations; and causing presentation of the one or more categorized segments on a map.

2. The system of claim 1, wherein determining the one or more segments based on the received information comprises determining the corresponding one or more recommendations for travelling via the segment based on a frequency of the events within the predetermined date range.

3. The system of claim 1, wherein determining the one or more segments based on the received information comprises determining the corresponding one or more recommendations based on time of the travel from the origin to the destination and times of the events in a given day.

4. The system of claim 1, wherein the information of the events in the geographic area comprises respective geographic locations of the events.

5. The system of claim 4, wherein determining the one or more segments based on the received information comprises determining the one or more segments based on one or more of the events taking place within a predetermined distance from the segments.

6. The system of claim 1, wherein the instructions cause the system to further perform:

determining one or more second routes alternative to at least a portion of the first route, the portion of the first route comprising one or more segments associated with one or more corresponding recommendations below a predetermined threshold for travel.

7. The system of claim 1, wherein determining from the predetermined geographic area the one or more first routes for travelling from the origin to the destination comprises:

based on the received information, determining one or more stops in the predetermined geographic area, each stop being associated with a corresponding recommendation for travelling via the stop; and based on the recommendation for travelling via the each stop, determining the first routes each comprising the one or more stops.

8. The system of claim 7, wherein:

the travel is implemented by a delivery carrier; and based on the received information, determining the one or more stops in the predetermined geographic area comprises:

determining the one or more stops based on delivery requirement to one or more locations in the predetermined geographic area.

9. A computing method, comprising:

receiving information of events in a predetermined geographic area, the information of the events comprising respective times at which the events occurred within a predetermined date range, and the information comprising a respective event type for each of the events, each of the respective event types being selected from a plurality of different event types;

determining an origin and at least one destination;

determining from the predetermined geographic area one or more first routes for traveling from the origin to the destination;

determining, based on the respective event types and the respective times at which the events occurred within the predetermined date range of the received information, one or more segments in each of the first routes, each segment being associated with a corresponding recommendation for travelling via the segment, the corresponding recommendation indicating a measure of difficulty for travelling via the segment;

categorizing the one or more segments based on the corresponding one or more recommendations; and causing presentation of the one or more categorized segments on a map.

10. The method of claim 9, wherein determining the one or more segments based on the received information comprises determining the corresponding one or more recommendations for travelling via the segment based on a frequency of the events within the predetermined date range.

11. The method of claim 9, wherein determining the one or more segments based on the received information comprises determining the corresponding one or more recommendations based on time of the travel from the origin to the destination and times of the events in a given day.

12. The method of claim 9, wherein the information of the events in the geographic area comprises respective geographic locations of the events.

13. The method of claim 12, wherein determining the one or more segments based on the received information comprises determining the one or more segments based on one or more of the events taking place within a predetermined distance from the segments.

14. The method of claim 9, further comprising:

determining one or more second routes alternative to at least a portion of the first route, the portion of the first route comprising one or more segments associated with one or more corresponding recommendations below a predetermined threshold for travel.

15. The method of claim 9, wherein determining from the predetermined geographic area the one or more first routes for travelling from the origin to the destination comprises:

based on the received information, determining one or more stops in the predetermined geographic area, each stop being associated with a corresponding recommendation for travelling via the stop; and based on the recommendation for travelling via the each stop, determining the first routes each comprising the one or more stops.

16. The method of claim 15, wherein:

the travel is implemented by a delivery carrier; and based on the received information, determining the one or more stops in the predetermined geographic area comprises:

determining the one or more stops based on delivery requirement to one or more locations in the predetermined geographic area.

\* \* \* \* \*